US011549052B2

(12) United States Patent
Farmer et al.

(10) Patent No.: US 11,549,052 B2
(45) Date of Patent: Jan. 10, 2023

(54) MULTIFUNCTIONAL COMPOSITION FOR ENHANCED OIL RECOVERY, IMPROVED OIL QUALITY AND PREVENTION OF CORROSION

(71) Applicant: Locus Solutions IPCo, LLC, Solon, OH (US)

(72) Inventors: Sean Farmer, North Miami Beach, FL (US); Ken Alibek, Solon, OH (US); Kent Adams, Oro Valley, AZ (US); Karthik N. Karathur, Solon, OH (US); Alibek Moldakozhayev, Solon, OH (US); Anthony Nerris, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

(21) Appl. No.: 16/762,800

(22) PCT Filed: Nov. 8, 2018

(86) PCT No.: PCT/US2018/059857
§ 371 (c)(1),
(2) Date: May 8, 2020

(87) PCT Pub. No.: WO2019/094615
PCT Pub. Date: May 16, 2019

(65) Prior Publication Data
US 2020/0362228 A1   Nov. 19, 2020

Related U.S. Application Data

(60) Provisional application No. 62/610,610, filed on Dec. 27, 2017, provisional application No. 62/583,016, filed on Nov. 8, 2017.

(51) Int. Cl.
*E21B 37/06* (2006.01)
*C09K 8/584* (2006.01)
(Continued)

(52) U.S. Cl.
CPC ............... *C09K 8/584* (2013.01); *C09K 8/54* (2013.01); *E21B 37/06* (2013.01); *E21B 41/02* (2013.01);
(Continued)

(58) Field of Classification Search
CPC ...... C09K 8/584; C09K 8/54; C09K 2208/32; E21B 49/0875; E21B 37/06; E21B 41/02; E21B 43/16
See application file for complete search history.

(56) References Cited

U.S. PATENT DOCUMENTS 3,191,676 A   6/1965   Froning
3,581,824 A   6/1971   Hurd
(Continued)

FOREIGN PATENT DOCUMENTS

CN   102352227 A   2/2012
CN   102399547 A   4/2012
(Continued)

OTHER PUBLICATIONS

Amani, H., et al., "Comparative Study of Biosurfactant Producing Bacteria in MEOR Applications." Journal of Petroleum Science and Engineering, 2010, 75:209-214.
(Continued)

*Primary Examiner* — Silvana C Runyan
(74) *Attorney, Agent, or Firm* — Saliwanchik, Lloyd & Eisenschenk

(57) ABSTRACT

The subject invention provides compositions and methods for simultaneously enhancing oil recovery, improving the quality of oil and gas through reduction in sulfur-containing
(Continued)

compounds, and preventing and/or reducing corrosion of oil and gas production equipment. A multi-functional composition is provided comprising an antimicrobial biosurfactant component, a first ammonium salt, and ammonium hydroxide. In some embodiments, the efficiency of the composition is further enhanced by the addition of a chelating agent, a phenol (e.g., carbolic acid or phenolic acid), and/or an $H_2S$ scavenger. In some embodiments, the composition is further enhanced for use in cold climates by the addition of an antifreeze mixture comprising one or more of a second ammonium salt, sodium chloride and glycerol.

12 Claims, 2 Drawing Sheets

(51) Int. Cl.
  *E21B 49/08* (2006.01)
  *C09K 8/54* (2006.01)
  *E21B 41/02* (2006.01)
  *E21B 43/16* (2006.01)
(52) U.S. Cl.
  CPC .......... *E21B 43/16* (2013.01); *E21B 49/0875* (2020.05); *C09K 2208/20* (2013.01); *C09K 2208/32* (2013.01)

(56) References Cited

U.S. PATENT DOCUMENTS

| | | | |
|---|---|---|---|
| 3,871,956 A | 3/1975 | Azarowics | |
| 4,369,125 A | 1/1983 | Kragen et al. | |
| 4,450,908 A | 5/1984 | Hitzman | |
| 4,487,262 A | 12/1984 | Venkatesan et al. | |
| 4,522,261 A | 6/1985 | McInerney et al. | |
| 4,561,501 A | 12/1985 | Shaw et al. | |
| 4,793,826 A | 12/1988 | Hayes et al. | |
| 4,905,761 A | 3/1990 | Bryant | |
| 5,156,652 A * | 10/1992 | Gregoli | C10L 1/328 |
| | | | 137/13 |
| 5,165,477 A | 11/1992 | Shell et al. | |
| 5,284,576 A * | 2/1994 | Weers | C10L 1/221 |
| | | | 208/236 |
| 5,869,325 A | 2/1999 | Crabtree et al. | |
| 6,033,901 A | 3/2000 | Powell, Jr. | |
| 6,942,037 B1 * | 9/2005 | Arnold | C09K 8/532 |
| | | | 166/300 |
| 7,472,747 B1 | 1/2009 | Brigmon et al. | |
| 7,677,673 B2 | 3/2010 | Tranquilla et al. | |
| 7,681,638 B2 | 3/2010 | Soni et al. | |
| 8,188,012 B2 | 5/2012 | Weerasooriya et al. | |
| 8,316,933 B2 | 11/2012 | Kohr | |
| 9,422,470 B2 | 8/2016 | Xu et al. | |
| 9,441,115 B2 | 9/2016 | Wu et al. | |
| 9,550,937 B2 | 1/2017 | Campbell et al. | |
| 9,683,164 B2 | 6/2017 | Gunawan et al. | |
| 9,725,986 B2 | 8/2017 | Xu et al. | |
| 9,884,986 B2 | 2/2018 | Gunawan et al. | |
| 10,023,787 B2 | 7/2018 | Benoit et al. | |
| 10,190,038 B2 | 1/2019 | Armstrong et al. | |
| 2001/0056047 A1 * | 12/2001 | Meine | C11D 1/8255 |
| | | | 510/111 |
| 2004/0231845 A1 | 11/2004 | Cooke, Jr. | |
| 2007/0069182 A1 * | 3/2007 | Cassidy | C23F 11/184 |
| | | | 252/387 |
| 2007/0125536 A1 | 6/2007 | Acock et al. | |
| 2007/0151726 A1 | 7/2007 | Crews et al. | |
| 2008/0167445 A1 | 7/2008 | Podella et al. | |
| 2008/0280789 A1 * | 11/2008 | Welton | C09K 8/528 |
| | | | 507/213 |
| 2008/0302531 A1 | 12/2008 | Berger et al. | |
| 2009/0029879 A1 | 1/2009 | Soni et al. | |
| 2010/0044031 A1 | 2/2010 | Fallon et al. | |
| 2010/0163230 A1 | 7/2010 | Kotlar | |
| 2011/0139262 A1 | 6/2011 | Aburto Anell et al. | |
| 2011/0290482 A1 | 12/2011 | Weerasooriya et al. | |
| 2012/0037368 A1 | 2/2012 | Eick et al. | |
| 2012/0055685 A1 | 3/2012 | Sanders et al. | |
| 2012/0122740 A1 | 5/2012 | Roldan Carrillo et al. | |
| 2012/0292022 A1 | 11/2012 | Choban et al. | |
| 2013/0020082 A1 | 1/2013 | Lumsden | |
| 2013/0062053 A1 * | 3/2013 | Kohr | C09K 8/582 |
| | | | 166/246 |
| 2013/0264060 A1 | 10/2013 | De Wolf et al. | |
| 2013/0319656 A1 | 12/2013 | Brownlee | |
| 2014/0073541 A1 | 3/2014 | Ravikiran et al. | |
| 2014/0273150 A1 | 9/2014 | Angel | |
| 2014/0305649 A1 | 10/2014 | Tang et al. | |
| 2014/0315765 A1 | 10/2014 | McDaniel | |
| 2014/0332212 A1 | 11/2014 | Ayers et al. | |
| 2014/0360727 A1 | 12/2014 | Milam et al. | |
| 2015/0037302 A1 | 2/2015 | Bralkowski et al. | |
| 2015/0068950 A1 | 3/2015 | See et al. | |
| 2015/0259642 A1 | 9/2015 | Sangwai et al. | |
| 2015/0300139 A1 * | 10/2015 | Armstrong | E21B 43/26 |
| | | | 166/278 |
| 2016/0002521 A1 | 1/2016 | Dillon et al. | |
| 2016/0145487 A1 | 5/2016 | Alam et al. | |
| 2016/0160111 A1 | 6/2016 | Smith et al. | |
| 2016/0222280 A1 | 8/2016 | Kohr et al. | |
| 2016/0244347 A1 | 8/2016 | Angel | |
| 2016/0251565 A1 | 9/2016 | Yanagisawa et al. | |
| 2016/0333258 A1 * | 11/2016 | Drake | E21B 37/00 |
| 2017/0037301 A1 | 2/2017 | Alwattari | |
| 2017/0044424 A1 | 2/2017 | Dwarakanath et al. | |
| 2017/0138135 A1 | 5/2017 | Almutairi | |
| 2018/0201531 A1 | 7/2018 | Cohen et al. | |
| 2018/0282608 A1 * | 10/2018 | Gopal | C23G 1/19 |
| 2019/0292436 A1 * | 9/2019 | Mason | C09K 8/845 |
| 2019/0359562 A1 | 11/2019 | Lyman et al. | |

FOREIGN PATENT DOCUMENTS

| | | |
|---|---|---|
| CN | 102925397 A | 2/2013 |
| CN | 103449696 A | 12/2013 |
| CN | 104109646 A | 10/2014 |
| CN | 104974952 B | 10/2015 |
| CN | 105154050 A | 12/2015 |
| CN | 103614131 B | 1/2016 |
| CN | 105753283 A | 7/2016 |
| CN | 108373912 A | 8/2018 |
| GB | 2450204 A | 12/2008 |
| JP | 2010200695 A | 9/2010 |
| JP | 2016000017 A | 1/2016 |
| KR | 101481459 B1 | 1/2015 |
| WO | 2007129332 A1 | 11/2007 |
| WO | 2010111226 A2 | 9/2010 |
| WO | 2013110132 A1 | 8/2013 |
| WO | 2014152350 A1 | 9/2014 |
| WO | 2015093934 A1 | 6/2015 |
| WO | 2015167864 A1 | 11/2015 |
| WO | 2016196680 A1 | 12/2016 |
| WO | 2017040903 A1 | 3/2017 |
| WO | 2017044953 A1 | 3/2017 |
| WO | 2018049182 A2 | 3/2018 |
| WO | 2018107162 A1 | 6/2018 |
| WO | 2018129299 A1 | 7/2018 |
| WO | 2018148265 A2 | 8/2018 |
| WO | 2018148265 A3 | 8/2018 |
| WO | 2018148397 A3 | 8/2018 |
| WO | 2018160995 A1 | 9/2018 |
| WO | 2018191172 A1 | 10/2018 |
| WO | 2018231791 A1 | 12/2018 |
| WO | 2018237137 A1 | 12/2018 |
| WO | 2019022996 A1 | 1/2019 |
| WO | 2019022998 A1 | 1/2019 |
| WO | 2019046183 A1 | 3/2019 |
| WO | 2019067356 A1 | 4/2019 |
| WO | 2019089730 A1 | 5/2019 |
| WO | 2019094615 A1 | 5/2019 |
| WO | 2019133555 A1 | 7/2019 |
| WO | 2019191296 A1 | 10/2019 |

(56) References Cited

FOREIGN PATENT DOCUMENTS

| WO | 2019200054 A1 | 10/2019 |
| WO | 2019204715 A1 | 10/2019 |
| WO | 2019213055 A1 | 11/2019 |
| WO | 2019222168 A1 | 11/2019 |
| WO | 2020006194 A1 | 1/2020 |

OTHER PUBLICATIONS

Amosa, M., et al., "Sulphide Scavengers in Oil and Gas Industry—A Review." NAFTA, 2010, 61(2): 85-92.

Das, N., et al., "Microbial Degradation of Petroleum Hydrocarbon Contaminants: An Overview." Biotechnology Research International, 2010, 2011, Article ID 941810: 1-13.

De Almeida, D.G., et al., "Biosurfactants: Promising Molecules for Petroleum Biotechnology Advances." Frontiers in Microbiology, 2016, 7(1718): 1-14.

De Oliveira, M., et al., "Review: Sophorolipids A promising Biosurfactant and it's Applications." International Journal of Advanced Biotechnology and Research, 2015, 6(2): 161-174.

Elshafie, A.E., et al., "Sophorolipids Production by Candida Bombicola ATCC 22214 and its Potential Application in Microbial Enhanced Oil Recovery." Frontiers in Microbiology, 2015, 6(1324): 1-11.

El-Sheshtawy, H.S., et al., "Production of Biosurfactants by Bacillus Licheniformis and Candida Albicans for Application in Microbial Enhanced Oil Recovery." Egyptian Journal of Petroleum, 2016, 25: 293-298.

Ghojavand, H., et al., "Isolation of Thermotolerant, halotolerant, Facultative Biosurfactant-Producing Bacteria." Applied Microbiology and Biotechnology, 2008, 80: 1073-1085.

Gudina, E.J., et al., "Biosurfactant-Producing and Oil-Degrading Bacillus Subtilis Strains Enhance Oil Recovery in Laboratory Sand-Pack Columns." Journal of Hazardous Materials, 2013, 261:106-113.

Nitschke, M., et al., "Production and properties of a surfactant obtained from Bacillus subtilis grown on cassava wastewater." Bioresource Technology, 2006, 97: 336-341.

Pacwa-Plociniczak, M., et al., "Environmental Applications of Biosurfactants: Recent Advances." International Journal of Molecular Sciences, 2011, 12: 633-654.

Santos, D.K.F., et al., "Biosurfactants: Multifunctional Biomolecules of the 21st Century." International Journal of Molecular Sciences, 2016, 17(401): 1-31.

Sharma, A., et al., "A Study on Biosurfactant Production in Lactobacillus and Bacillus SP." International Journal of Current Microbiology and Applied Sciences, 2014, 3(11): 723-733.

Silva, R., et al., "Applications of Biosurfactants in the Petroleum Industry and the Remediation of Oil Spills." International Journal of Molecular Sciences, 2014, 15: 12523-12542.

Castaneda, L.C., et al., "Current situation of emerging technologies for upgrading of heavy oils" Catalysis Today, 2014, 220-222: 248-273.

Daverey, A., et al., "Production of sophorolipids by the yeast Candida bombicola using simple and low cost fermentative media." Food Research International, 2009, 42: 499-504.

Ines, M., et al., "Glycolipids Biosurfactants; Potential related Biomedical and Biotechnological Applications." Carbohydrate Research, 2015: 1-46.

Kaur, K. et al., "Biosurfactant production by yeasts isolated from hydrocarbon polluted environments." Environmental Monit Assess, 2017, 189(603): 1-13.

Kurtzman, C.P., et al., "Production of sophorolipid biosurfactants by multiple species of the Starmerella (Candida) bombicolayeast clade." FEMS Microbiol Lett, 2010, 311: 140-146.

Liu, X., et al., "Recovery of crude oil from oily sludge in an oilfield by sophorolipid." Petroleum Science and Technology, 2019, 37(13): 1582-1588.

Ma, X., et al., "Surface and biological activity of sophorolipid molecules produces by Wickerhamiella domercqiae var. sophorolipid CGMCC 1576." Journal of Colloid and Interface Science, 2012, 376: 165-172.

Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.

Rocha E Silva, F.C.P., et al., "Yeasts and bacterial biosurfactants as demulsifiers for petroleum derivative in seawater emulsions." AMB Expr., 2007, 7(202): 1-13.

Shah, M.U.H., et al., "Production of sophorolipids by Starmerella bombicola yeast using new hydrophobic substrates." Biochemical Engineering Journal, 2017, 127: 60-67.

Thaniyavarn, J., et al., "Production of Sophorolipid Biosurfactant by Pichia anomala." Bioscience, Biotechnology, and Biochemistry, 2008, 72(8): 2061-2068.

Umar, Z.D., et al., "Rapid biodegradation of polycyclic aromatic hydrocarbons (PAHs) using effective Cronobacter sakazakii MM045 (KT933253)." MethodsX, 2017, 4: 104-117.

Wadekar, S., et al., "Sophorolipid Production by Starmerella bombicola (ATCC 22214) from Virgin and Waste Frying Oils, and the Effects of Activated Earth Treatment of the Waste Oils." J Am Oil Chem Soc, 2012, 89: 1029-1039.

Youssef, N., et al., "In Situ Biosurfactant Production by Bacillus Strains Injected into a Limestone Petroleum Reservoir." Applied and Environmental Microbiology, Feb. 2007, 73(4): 1239-1247.

De Brito, D., Biosurfactants from renewable raw materials, Universidade do Minho Departamento de Engenharia Biologica, Nov. 2013, chapter 1: pp. 1-26.

Sen, R., "Biosurfactants: Advances in Experimental Medicine and Biology." Landes Bioscience and Springer Science +Business Media, LLC, 2010, pp. 58, 116, and chapters 10-11: pp. 135-157.

Zafra, G., et al., "Biodegradation of polycyclic aromatic hydrocarbons by *Trichoderma* species: a mini review." Environ Sci Pollut Res, 2015, 22: 19426-19433.

* cited by examiner

MULTIFUNCTIONAL COMPOSITION FOR ENHANCED OIL RECOVERY, IMPROVED OIL QUALITY AND PREVENTION OF CORROSION

CROSS-REFERENCE TO RELATED APPLICATIONS

This application is a National Stage Application of International Application No. PCT/US2018/059857, filed Nov. 8, 2018; which claims priority to U.S. Provisional Application Ser. No. 62/583,016, filed Nov. 8, 2017, and No. 62/610,610, filed Dec. 27, 2017, all of which are incorporated by reference herein in their entirety.

BACKGROUND OF THE INVENTION

Oil exists in small pores and narrow fissures within the body of reservoir rocks underneath the surface of the earth. Natural pressure of the reservoir causes the oil to flow up to the surface, thereby providing primary production of an oil well; however, as oil production progresses, the reservoir pressure is depleted to a point at which artificial lift or pumping is required to maintain an economical oil production rate.

When it is necessary to provide external energy for the reservoir to achieve additional oil recovery (secondary recovery), the extra energy can be introduced by injecting gas (gas injection) and/or water (water flooding). After some years of operation in a field, the injected fluids flow preferentially along highly permeable layers that cause these fluids to by-pass oil-saturated areas in the reservoir. Therefore, an increasing quantity of water (or gas) rises with the oil and, by decreasing the ratio of oil to water, eventually it becomes uneconomic to continue the process and the field must be abandoned. In this situation, a third stage of oil recovery, so-called tertiary production or Enhanced Oil Recovery (EOR) can be considered.

At this tertiary stage, technically advanced methods are employed to either modify the properties of reservoir fluids or the reservoir rock characteristics. In general, the methods can be classified into four main categories as thermal methods, chemical methods, miscible or solvent injection, and microbial methods.

Microbial Enhanced Oil Recovery (MEOR) is a multidisciplinary field incorporating, among others: geology, chemistry, microbiology, fluid mechanics, petroleum engineering, environmental engineering and chemical engineering. The microbial processes proceeding in MEOR can be classified according to the oil production problem in the field: well bore clean-up, which removes mud and other debris blocking the channels where oil flows; well stimulation, which improves the flow of oil from the drainage area into the well bore; and enhanced water floods, which increase microbial activity by injecting selected microbes and sometimes nutrients.

Thus, MEOR uses microorganisms and/or their metabolites to enhance the recovery of residual oil. In this method, nutrients and suitable bacteria, which preferably grow under the anaerobic reservoir conditions, are injected into the reservoir. Microbial by-products that can include biosurfactants, biopolymers, acids, solvents, gases, and enzymes modify the properties of the oil and the interactions between oil, water, and the porous media, thereby increasing the mobility, and consequently the recovery, of oil.

Microorganisms and their growth by-products can also be useful in the maintenance of equipment and structures used in oil recovery, transmission, and transport. One major factor affecting the safety and efficiency of crude oil and natural gas production and the integrity of equipment is the presence of hydrogen sulfide ($H_2S$) gas. $H_2S$ gas is found naturally in petroleum and natural gas in low amounts; however, when $H_2S$ levels become high the oil or gas is said to become "sour."

Hydrogen sulfide is a concern in the oil and gas industry for a variety of reasons. For example, $H_2S$ can become an air pollutant near petroleum refineries and in oil and gas extraction areas. Atmospheric releases of $H_2S$ represent a significant public health concern. $H_2S$ is extremely toxic. Exposure to concentrations above 100 ppm can cause damage to internal organs, and exposures above 600 ppm can be rapidly fatal.

Aside from direct health concerns, $H_2S$ causes corrosion of oil and gas production and transmission equipment. Corrosion of pipes, valves, fittings and tanks can cause a breakdown of oil and gas gathering systems and can be a serious threat to both employees and the public. Also, repairing and replacing corroded equipment can lead to substantial expense.

Corrosion that results from the presence of microorganisms, i.e., microbial influenced corrosion (MIC), is a significant problem for oil and gas production and transmission. When surfaces in a well, or other surfaces, are exposed to natural environments, they are rapidly colonized by bacteria that are naturally present in the surrounding environment, which in turn can form a biofilm. The upper layers of biofilm are mostly aerobic while the regions underneath could be anaerobic due to the depletion of oxygen by the biofilm.

Certain microorganisms can colonize these anaerobic niches and produce byproducts that reduce the quality of crude oil and natural gas, cause corrosion of metals, and pose a significant threat to health and the environment. MIC has been implicated in the deterioration of metals in, for example, pipelines and off-shore oil rigs in the oil and shipping industries. Other environments are affected as well, including cooling water recirculation systems in industrial settings and sewage treatment facilities and pipelines.

Microorganisms that are responsible for MIC include sulfate-reducing bacteria ("SRB") and acid-producing bacteria ("APB"). APB typically produce corrosion-inducing compounds through anaerobic fermentation. These compounds can include organic acids, such as volatile fatty acids, and alcohols. As a result of organic acid production, the pH underneath an APB biofilm can be considerably lower than that of the bulk fluid, thus contributing to deterioration of the structures on which the bacteria grow.

SRB and archaea obtain energy by oxidizing organic compounds or molecular hydrogen ($H_2$) while reducing sulfate ($SO^{2-}_4$) to $H_2S$. In a sense, these organisms "breathe" sulfate rather than oxygen in a form of anaerobic respiration. Most SRB can also reduce other oxidized inorganic sulfur compounds, such as sulfite, thiosulfate, or elemental sulfur to hydrogen sulfide.

SRB contribute significantly to increased $H_2S$ concentrations in crude oil and natural gas, thereby impacting the quality of the oil and gas, as well as the safety and integrity of oilfield and natural gas equipment and production. Additionally, SRB production of $H_2S$ leads to progressive corrosion of iron in anoxic, sulfate-rich environments. SRB can also corrode iron by direct utilization of the metal itself, which is likely the primary process driving iron corrosion in sulfate-containing anoxic environments.

Furthermore, $H_2S$ produced by SRB is metabolized by sulfur-oxidizing organisms, such as *Thiobacillus*, into sulfuric acid—one of the strongest acids known. Sulfuric acid degradation can cause extreme damage to pipes and other equipment used in the oil and gas industries, and has been found to cause billions of dollars in corrosion damage each year in the U.S.

The preferred biocorrosion-eliminating strategy depends on which organisms are present in the environment being treated. For example, susceptibility of archaea to antimicrobial agents is different from susceptibility of proteobacteria. Thus, in light of these differences, the development and application of a broad-spectrum antibacterial strategy with high efficacy is desirable to eliminate corrosive bacteria and reduce $H_2S$ in crude oil, natural gas and wellbore brine.

Conventional corrosion inhibition approaches involve a variety of strategies. These include modification in the pH, redox potential, and/or resistivity of the environment in which the equipment is to be installed; inorganic coatings; cathodic protection; and the use of "traditional" biocides.

Of these methods for combatting biocorrosion, the most common methods generally include traditional biocides. Oxidizing biocides can be used in some systems, as well as non-oxidizing biocides, such as amine-type compounds and aldehydes. Non-oxidizing biocides are more stable and can be used in a variety of environments. Despite the fact that biocides are commonly used, the cost of the biocides, and the potential harm caused by releasing large quantities of inorganic compounds into the environment, are significant.

An alternative method, which has become popular in recent years, is nitrate treatment. Nitrate technology is based on selective growth of nitrate-reducing bacteria ("NRB"), which replace the harmful SRB and reduce the ability of SRB to grow extensively. Many nitrate compounds are soluble in water, do not dissolve in oil, are not sensitive to salt levels, and have low toxicity. Also, nitrate compounds can be completely consumed, their activity increases with time, and they are not temperature-sensitive.

Even though the unit cost of nitrates is not high, the cost of treatment on a large scale, such as in an oil and gas setting, can be extremely high. Furthermore, nitrate treatments have other drawbacks. For example, they can be inefficient for gravity lines and can increase nitrogen levels in wastewater. Additionally, resultant $N_2$ gas (or residual $NO_3$) may present problems for water treatment plants; costs for the prevention mode may be excessive in long retention time lines, which may be impacted by high BOD levels; and the bio-mediated oxidation mode may require several hours, making nitrates less effective in certain applications.

Thus, damage to the petroleum and natural gas industries caused by MIC, in particular damage caused by $H_2S$, remains profound. Each year these industries experience many billions of dollars' worth of loss due to the effects of corrosion, the need for cleaning "sour" natural gas and crude oil, and the implementation of measures to reduce various environmental hazards caused by $H_2S$.

As noted above, many biocide treatments are not environmentally friendly and are not highly efficient. Nitrate treatments can be safer and more effective, but they can come with significant costs. Additionally, if enhanced oil recovery is also desired from a well being treated for MIC, a variety of overlapping products must be employed to, for example, stimulate the well while killing bacteria. Furthermore, many treatment methods cannot be utilized in locations with colder temperatures due to freezing of the composition during transport and pumping near the well surface.

Thus, there is a need in the art for an effective, environmentally-friendly, and economically-acceptable means for reducing $H_2S$, preventing and/or inhibiting SRB growth in oil and gas formations and on the surfaces of oil and gas production equipment, while simultaneously enhancing oil recovery.

BRIEF SUMMARY OF THE INVENTION

The subject invention provides environmentally-friendly compositions and methods for simultaneously enhancing oil recovery, improving the quality of oil and gas, and preventing and/or reducing corrosion of oil and gas production equipment.

Advantageously, in certain embodiments, the subject invention serves one or more of these functions by reducing surface and/or interfacial tension within a subterranean formation, controlling sulfate reducing bacteria (SRB), reducing and/or scavenging hydrogen sulfide ($H_2S$) and other sulfur-containing compounds in oil and gas, dissolving scale, reducing and/or preventing corrosion of equipment induced by microbes and/or acids (e.g., MIC), reducing the acidity of oil and/or gas, and/or reducing the "sourness" of crude oil and gas. Additionally, the subject invention can be useful in a variety of well types, including under-producing and/or stripper wells.

In preferred embodiments, a multi-functional composition is provided for biochemically enhancing oil recovery, reducing $H_2S$ in oil and/or gas, and reducing and/or preventing corrosion of oil and gas industry equipment.

In certain embodiments, the multi-functional composition is capable of being used in geographies with temperatures that are near, at or below freezing. This is due to the addition of an "antifreeze" mixture, which prevents the composition from freezing, for example, during transport or while being pumped in and out of a formation.

In certain embodiments, the composition comprises an antimicrobial biosurfactant component, a first ammonium salt, and ammonium hydroxide. In some embodiments, the efficiency of the composition is further enhanced by the addition of a chelating agent, a phenol (e.g., carbolic acid or phenolic acid), and/or an $H_2S$ scavenger.

In some embodiments, the composition is further enhanced for use in cold climates by the addition of an antifreeze mixture. The antifreeze mixture can comprise one or more of a second ammonium salt, sodium chloride and glycerol. In certain embodiments, the antifreeze mixture can also comprise brine liquids.

Advantageously, the composition has surface/interfacial tension-reducing properties, anti-biofilm properties, antimicrobial properties (including anti-SRB properties), and corrosion prevention and removal properties. Furthermore, through the addition of the antifreeze mixture, the composition is capable of remaining in liquid form, instead of freezing or accumulating ice crystals, when used in geographic locations having temperatures near, at, or below freezing.

The antimicrobial biosurfactant component can comprise one or more biosurfactants. The one or more biosurfactants can include glycolipids such as, for example, sophorolipids, rhamnolipids, mannosylerythritol lipids, or a combination thereof. Advantageously, the biosurfactants can be used at relatively low concentrations to inhibit the growth of bacteria, particularly, Gram-positive bacteria.

In some embodiments, the antimicrobial biosurfactant blend further comprises one or more lipopeptide biosurfactants, for example, surfactin and/or lichenysin. The use of surfactin broadens the spectrum of antimicrobial activity to include Gram-negative bacteria and archaea.

Advantageously, in one embodiment, the biosurfactants have surface/interfacial tension reduction properties in addition to their antimicrobial properties. Thus, the biosurfactants are also useful in enhancing oil recovery.

In some embodiments, the solvent is an alcohol, for example, methanol, ethanol or isopropyl alcohol. In specific embodiments, the solvent is isopropyl alcohol.

In some embodiments, the first and/or second ammonium salts are ammonium chloride, ammonium phosphate, or diammonium phosphate. In specific embodiments, the first ammonium salt is ammonium phosphate or diammonium phosphate, and the second ammonium salt is diammonium phosphate. The first and second ammonium salts can be the same or different.

In some embodiments, a 70% solution of ammonium hydroxide is used in the composition.

In some embodiments, the composition further comprises a chelating agent. Chelating agents can be useful for dissolving scale buildup present, for example, in subterranean formations and on the surfaces of oil and gas equipment. In specific embodiments, the chelating agent is selected from EDTA and sodium citrate.

In some embodiments, the composition further comprises a phenol, such as carbolic acid or phenolic acid, which is effective for enhancing oil recovery, as well as controlling microbial growth.

In some embodiments, the composition further comprises one or more $H_2S$ scavengers capable of converting $H_2S$ into more inert forms. The one or more $H_2S$ scavengers can be, for example, nitrate or nitrite solutions. In specific embodiments, the $H_2S$ scavengers are selected from nitrate or nitrite salts, including but not limited to, sodium nitrate, sodium nitrite, ammonium nitrate, ammonium nitrite, potassium nitrate, and potassium nitrite. In preferred embodiments, the nitrate or nitrite salts are ammonium nitrate or ammonium nitrate. In another embodiment, the $H_2S$ scavenger can be glyoxal and/or the hydroxyl radical.

In a specific, exemplary embodiment, the multi-functional composition comprises a glycolipid biosurfactant and a sophorolipid biosurfactant, an ammonium salt, a phenol, EDTA, glyoxal, and ammonium hydroxide.

In one embodiment, the composition can be used to stimulate production of an oil well while simultaneously inhibiting $H_2S$ production through the control of SRB and other biocorrosive bacteria. Advantageously, the composition can have broad-spectrum antimicrobial properties, meaning it can be used to control, for example, both Gram-positive and Gram-negative bacteria, as well as archaea and other biocorrosive microorganisms. In one embodiment, the biocorrosive bacteria are in the form of a biofilm.

In one embodiment, the composition can be used to enhance oil recovery by dissolving scale buildup in formation pores and/or in oil and gas equipment that can obstruct the flow of oil and gas.

In one embodiment, the composition can be used to reduce the sourness and/or the acidity of oil. For example, the inclusion of ammonium compounds can increase the pH of oil, thus increasing its economic value and reducing the amount of processing required prior to refining the oil.

In one embodiment, the composition can be used to reduce the corrosion and deterioration of metal equipment and structures in, and on, which biocorrosive bacteria grow. In a specific embodiment, the composition can be used to reduce the acid-induced and/or microbial-induced corrosion and deterioration of equipment and structures used for crude oil and natural gas production.

In one embodiment, a method is provided for simultaneously enhancing oil recovery, improving the quality of oil and gas, and preventing and/or reducing corrosion of oil and gas production equipment. Specifically, the method comprises applying a composition of the subject invention to an oil and/or gas-containing formation by, for example, injecting the composition into a wellbore, and allowing the composition to (a) enhance oil and/or gas recovery, (b) reduce $H_2S$ concentration in the formation, (c) control SRB, and (d) dissolve scale.

In a specific embodiment, the method comprises applying a composition comprising an antimicrobial biosurfactant component, a solvent, a first ammonium salt and ammonium hydroxide to the oil and/or gas-containing formation.

Furthermore, the method can comprise adding a chelating agent, a phenol, and/or an $H_2S$ scavenger to the formation. In preferred embodiments, the chelating agent is EDTA, the phenol is carbolic acid or phenolic acid, and the $H_2S$ scavenger is glyoxal.

Furthermore, the method can comprise adding an antifreeze mixture comprising one or more of a second ammonium salt, sodium chloride, and glycerol to inhibit freezing and/or ice crystal accumulation within the composition when used in temperatures near, at or below freezing. In certain embodiments, the antifreeze mixture can also comprise brine fluids.

The subject methods can be used to stimulate an oil well, including an under-producing and/or stripper well. The methods can also be used to inhibit $H_2S$ and/or mercaptan production through the control of SRB and other biocorrosive bacteria, as well as to prevent and/or reduce corrosion of equipment due to microbes and/or acids.

Furthermore, in some embodiments, the methods can be used to improve the quality of oil and gas. This can be in the form of reducing the "sourness" of crude oil and gas, reducing the conversion of oil and gas to sour oil and gas, increasing the conversion of sour oil and gas to sweeter oil and gas, and/or preserving the sweetness of oil and gas.

In one embodiment, the method can further be used to improve the quality of recovered oil, for example, by applying the composition to oil being stored in a storage tank.

In certain embodiments, the subject methods benefit from the advantageous properties of microbial-produced biochemicals, such as biosurfactants, without the disadvantages that are associated with injecting microorganisms into oil and gas wells (e.g., MEOR). By using microbial growth by-products that have been isolated from the microbes that produce them, the subject invention can be used in a wider range of environments (e.g., formation temperatures and porosities), and with more predictability than when live microbial cells are used.

In one embodiment, the subject invention provides methods of producing a biosurfactant by cultivating a microorganism under conditions appropriate for growth and biosurfactant production; and isolating the biosurfactant from the supernatant resulting from cultivation. Optionally, the biosurfactant can be purified.

In one embodiment, the microorganism is a biosurfactant-producing bacterium, yeast or fungus. In one embodiment, the microorganism is a glycolipid-producing yeast, such as, e.g., *Starmerella bombicola* or *Wickerhamomyces anomalus*. In one embodiment, the microorganism is a lipopeptide-producing bacterium, such as a *Bacillus* spp. bacterium (e.g., *B. subtilis, B. amyloliquefaciens, B. licheniformis*). In one embodiment, the microorganism is a biosurfactant-producing *Trichoderma* spp. fungus.

The compositions and methods can be used in the oil and gas industry, agriculture, waste treatment, environmental cleanup, and other industries where biofilm and other microbial growth causes complications such as: production of toxic byproducts, e.g., $H_2S$ and mercaptans; corrosion of equipment; and reduction in quality of industrial, agricultural and manufactured products.

Advantageously, the present invention can be used without releasing large quantities of inorganic compounds into the environment. Additionally, the subject compositions and methods utilize components that are biodegradable and toxicologically safe. Thus, the present invention can be used in oil and gas production (and other industries) as an environmentally-friendly product.

DETAILED DESCRIPTION OF THE INVENTION

Figure 1A:
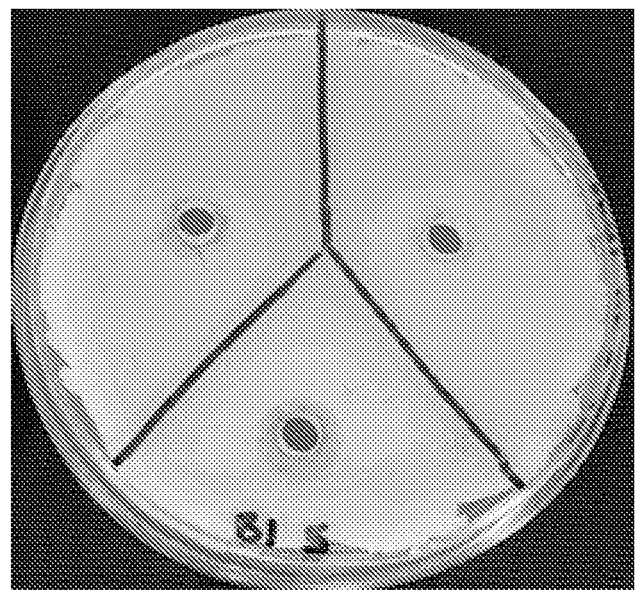
FIGS. 1A-1B show growth suppression of Gram$^+$ (*Bacillus subtilis* var. *locuses* B1) (1A) and Gram$^-$ (*Pseudomonas stutzeri*) (1B) bacteria treated with a composition according to the subject invention over a four day period. The composition comprised sophorolipid, ammonium hydroxide, isopropyl alcohol, ammonium phosphate, phenol and glyoxal.

The subject invention provides environmentally-friendly compositions and methods for simultaneously enhancing oil recovery, improving the quality of oil and gas, and preventing and/or reducing corrosion of oil and gas production equipment.

Advantageously, in certain embodiments, the subject invention serves one or more of these functions by reducing surface and/or interfacial tension within a subterranean formation, controlling sulfate reducing bacteria (SRB), reducing and/or scavenging hydrogen sulfide ($H_2S$) and other sulfur-containing compounds in oil and gas, dissolving scale, reducing and/or preventing corrosion of equipment induced by microbes and/or acids (e.g., MIC), reducing the acidity of oil and/or gas, and/or reducing the "sourness" of crude oil and gas. Additionally, the subject invention can be useful in a variety of well types, including under-producing and/or stripper wells.

In preferred embodiments, a multi-functional composition is provided for biochemically enhancing oil recovery, reducing $H_2S$ in oil and/or gas, and reducing and/or preventing corrosion of oil and gas industry equipment.

In certain embodiments, the multi-functional composition is capable of being used in geographies with temperatures that are near, at or below freezing. This is due to the addition of an "antifreeze" mixture, which prevents the composition from freezing, for example, during transport or while being pumped in and out of a formation.

In certain embodiments, the composition comprises an antimicrobial biosurfactant component, a first ammonium salt, and ammonium hydroxide. In some embodiments, the efficiency of the composition is further enhanced by the addition of a chelating agent, a phenol (e.g., carbolic acid or phenolic acid), and/or an $H_2S$ scavenger.

In some embodiments, the composition is further enhanced for use in cold climates by the addition of an antifreeze mixture comprising one or more of a second ammonium salt, sodium chloride and glycerol. The antifreeze composition can further comprise brine fluids.

In one embodiment, a method is provided for simultaneously enhancing oil recovery, improving the quality of oil and gas, and preventing and/or reducing corrosion of oil and gas production equipment. Specifically, the method comprises applying a composition of the subject invention to an oil and/or gas-containing formation by, for example, injecting the composition into a wellbore, and allowing the composition to (a) enhance oil and/or gas recovery, (b) reduce $H_2S$ concentration in the formation, (c) control SRB and (d) dissolve scale.

Advantageously, the method can be carried out in geographies where temperatures are cold enough to cause freezing and ice accumulation near the surface of the well or in storage and transportation tanks or vessels.

Selected Definitions

As used herein, "oil and natural gas production" refers to any and all operations involved in the extraction of crude oil and natural gas from the earth through its eventual processing and use by consumers. Oil and natural gas production can include, but is not limited to, drilling, pumping, recovery, transmission, processing, refining, transportation, and storage of oil and gas.

An "oil and natural gas production environment" refers to any environment, equipment, structure, or surface, whether naturally-occurring or man-made, wherein one or more aspects of oil and natural gas production occurs, including but not limited to, oil and/or gas-containing formations, drilling rigs, petroleum refineries, wellbores, oil well rods, flow lines, separators, pumps, pipes, tubing, casing, valves, fittings, gathering systems, and storage tanks.

As used herein, the term "enhanced oil recovery," "EOR" or "tertiary oil recovery" refers to increasing the mobility of oil in an oil-bearing formation or in an oil well in order to increase the amount of oil recovered therefrom. EOR can also include "well stimulation."

As used herein, the term "biochemically enhanced oil recovery" is EOR that is achieved through the use of biochemicals. In certain embodiments, the biochemicals are microbial-produced biochemicals, wherein the biochemicals are isolated from the supernatant that results from cultivation of a microorganism. These biochemicals can include, but are not limited to, microbial metabolites as defined herein, e.g., biosurfactants.

As used herein, the term "control" used in reference to microorganisms extends to the act of killing, disabling, immobilizing, eliminating or reducing population numbers of a microorganism, or otherwise rendering the organism substantially incapable of causing harm. Control can include disruption of biofilm.

As used herein, the term "biocorrosive bacteria" or "biocorrosive microorganism" means, any taxonomic grouping of bacteria, archaea, or other microorganisms known to contribute to microbial induced corrosion ("MIC") of metallic and/or non-metallic materials. Non-limiting examples include chemoautotrophs, sulfate-reducing bacteria, iron oxidizing bacteria, sulfur oxidizing bacteria, nitrate reducing bacteria, methanogens, and acid producing bacteria. These bacteria are capable of reducing metal directly, producing metabolic products that are corrosive (e.g., acids, hydrogen sulfide gas), and/or leading to the formation of biofilms that can alter the local environment to promote corrosion.

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The microbes may be in a vegetative state, in spore form, in mycelial form, in any other form of propagule, or a mixture of these. The microbes may be planktonic or in a biofilm form, or a mixture of both. The microbes may be intact or lysed. The cells may be present at, for example, a concentration of $1 \times 10^4$, $1 \times 10^5$, $1 \times 10^6$, $1 \times 10^7$, $1 \times 10^8$, $1 \times 10^9$, $1 \times 10^{10}$, or $1 \times 10^{11}$ or more CFU per milliliter of the composition. The by-products of growth may be, for example, metabolites, including surfactants and expressed proteins, cell membrane components, and/or other cellular components. In preferred embodiments, the composition comprises growth by-products that have been are isolated from the microbial culture.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, such as plant hormones, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "harvested" refers to removing some or all of a microbe-based composition from a growth vessel.

A "metabolite" refers to any substance produced by metabolism (e.g., a growth by-product) or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites can include, but are not limited to, enzymes, toxins, acids, solvents, alcohols, proteins, carbohydrates, vitamins, minerals, microelements, amino acids, polymers, and surfactants.

As used herein, an "isolated" or "purified" nucleic acid molecule, polynucleotide, polypeptide, protein, organic compound such as a small molecule (e.g., those described below), or other compound is substantially free of other compounds, such as cellular material, with which it is associated in nature. For example, a purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. A purified or isolated microbial strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight (dry weight) the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

In some embodiments, the microbes used for producing biochemicals according to the subject invention are "surfactant over-producing." For example, the strain may produce at least 0.1-10 g/L, e.g., 0.5-1 g/L surfactant. For example, the bacteria produce at least 10%, 25%, 50%, 100%, 2-fold, 5-fold, 7.5 fold, 10-fold, 12-fold, 15-fold or more compared to other oil-recovery microbial strains.

As used herein, "applying" a composition or product refers to contacting it with a target or site such that the composition or product can have an effect on that target or site. The effect can be due to, for example, the action of a biosurfactant or other ingredient of the composition, or the action of the ingredients of the composition in synergy. For example, the composition can be injected into oil wells and/or the piping, pumps, tanks, etc. associated with oil wells and the transmission, storage and/or refining of oil and/or gas.

As used herein, "surfactant" refers to a compound that lowers the surface tension (or interfacial tension) between two liquids or between a liquid and a solid. Surfactants act as, e.g., detergents, wetting agents, emulsifiers, foaming agents, and/or dispersants. A surfactant produced by microorganisms is referred to as a "biosurfactant."

As used herein, a "mercaptan" is another term for a thiol. Mercaptans are organosulfur compounds that contain a carbon-bonded sulfhydryl group and that are found in many hydrocarbon streams, mainly as an impurity. They are similar to alcohols, but with the $O_2$ atom replaced by a sulfur (S) atom. Some mercaptans present strong odors and can cause serious disruptions to daily life. Humans are highly sensitive to mercaptans at very low levels. For this reason, mercaptans are used as odorizers in consumer and commercial natural gas to signal gas leaks. Some mercaptans can cause corrosion, and often lead to copper strip test failures under certain conditions. Mercaptans can also negatively affect catalysis and solid adsorption beds, such as silica gel or alumina, by competing for access to the same active sites. Mercaptans removal is necessary for reducing sulfur emissions, as combustion and emission of mercaptan-containing compounds will lead to SOx formation.

As used herein, a "biofilm" is a complex aggregate of microorganisms, such as bacteria, wherein the cells adhere to each other. The cells in biofilms are physiologically distinct from planktonic cells of the same organism, which are single cells that can float or swim in liquid medium.

As used herein, a "stripper well" or "marginal well" refers to a mature oil well that is nearing the end of its economically useful life. Marginal oil wells are generally characterized in that their daily production of crude oil has dropped to between 10 and 15 barrels per day, or less, for any twelve-month period. These wells often go abandoned prematurely, leaving behind hundreds or even thousands of barrels of valuable and useful crude oil.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "and" and "the" are understood to be singular or plural. Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

Other features and advantages of the invention will be apparent from the following description of the preferred embodiments thereof, and from the claims. All references cited herein are hereby incorporated by reference.

Compositions of the Subject Invention

In preferred embodiments, a multi-functional composition is provided for biochemically enhancing oil recovery, reducing $H_2S$ in oil and/or gas, and reducing and/or preventing corrosion of oil and gas industry equipment.

In certain embodiments, the multi-functional composition is capable of being used in geographies with temperatures that are near, at or below freezing. This is due to the addition of an "antifreeze" mixture, which prevents the composition from freezing, for example, during transport or while being pumped in and out of a formation.

Advantageously, the composition can have broad-spectrum antimicrobial properties, meaning it can be used to control, for example, both Gram-positive and Gram-negative bacteria, as well as archaea and other biocorrosive microorganisms. In one embodiment, the biocorrosive bacteria are in the form of a biofilm.

In one embodiment, the composition can be used to enhance oil recovery by dissolving scale buildup in formation pores and/or in oil and gas equipment that can obstruct the flow of oil and gas.

In one embodiment, the composition can be used to reduce the sourness and/or the acidity of oil. For example, the inclusion of ammonium compounds can increase the pH of oil, thus increasing its economic value and reducing the amount of processing required prior to refining the oil.

The composition can reduce $H_2S$ and control biocorrosive bacteria present in oil and natural gas production environments. Due to reduced concentrations of biocorrosive bacteria and $H_2S$, the composition can further prevent, reduce and/or eliminate the corrosion and deterioration (MIC) of equipment and structures in, and on, which biocorrosive bacteria grow, particularly those that are made of metal.

In certain embodiments, the composition comprises an antimicrobial biosurfactant component, a solvent, a first ammonium salt, and ammonium hydroxide. In some embodiments, the composition is further enhanced by the addition of one or more of a chelating agent, a phenol (e.g., carbolic acid or phenolic acid), and/or a $H_2S$ scavenger.

In a specific, exemplary embodiment, the multi-functional composition comprises a glycolipid biosurfactant and a sophorolipid biosurfactant, an ammonium salt, a phenol, EDTA, glyoxal, and ammonium hydroxide.

In some embodiments, the composition is further enhanced for use in cold climates by the addition of an antifreeze mixture comprising one or more of a second ammonium salt, sodium chloride and glycerol. In certain embodiments, the antifreeze mixture can further comprise brine fluids.

Advantageously, the composition has surface/interfacial tension-reducing properties, anti-biofilm properties, antimicrobial properties (including anti-SRB properties), and corrosion prevention and removal properties. Furthermore, through the addition of the antifreeze mixture, the composition is capable of remaining in liquid form, instead of freezing or accumulating ice crystals, when used in geographic locations having temperatures near, at, or below freezing. The antimicrobial biosurfactant component can comprise one or more biosurfactants. The one or more biosurfactants can include glycolipids such as, for example, sophorolipids, rhamnolipids, mannosylerythritol lipids, or a combination thereof. Advantageously, the biosurfactants can be used at relatively low concentrations to inhibit the growth of bacteria, particularly, Gram-positive bacteria.

In some embodiments, the antimicrobial biosurfactant blend further comprises one or more lipopeptide biosurfactants, for example, surfactin and/or lichenysin. The use of surfactin broadens the spectrum of antimicrobial activity to include Gram-negative bacteria and archaea.

Biosurfactants are a structurally diverse group of surface-active substances produced by microorganisms. Biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces.

Biosurfactants accumulate at interfaces, thus reducing interfacial tension and leading to the formation of aggregated micellular structures in solution. The ability of biosurfactants to form pores and destabilize biological membranes permits their use as antibacterial, antifungal, and hemolytic agents. Combined with the characteristics of low toxicity and biodegradability, biosurfactants are advantageous for use in the oil and gas industry as effective inhibitors of SRB growth and a resulting reduction of hydrogen sulfide production.

Biosurfactants include low molecular weight glycolipids, lipopeptides, flavolipids, phospholipids, and high molecular weight polymers such as lipoproteins, lipopolysaccharide-protein complexes, and polysaccharide-protein-fatty acid complexes. The hydrocarbon chain of a fatty acid acts as the common lipophilic moiety of a biosurfactant molecule, whereas the hydrophilic part is formed by ester or alcohol groups of neutral lipids, by the carboxylate group of fatty acids or amino acids (or peptides), organic acid in the case of flavolipids, or, in the case of glycolipids, by the carbohydrate.

Microbial biosurfactants are produced by a variety of microorganisms such as bacteria, fungi, and yeasts. Exemplary biosurfactant-producing microorganisms include those listed below, including, and/or in addition to, *Pseudomonas* species (*P. aeruginosa, P. putida, P. florescens, P. fragi, P. syringae*); *Flavobacterium* spp.; *Starmerella* spp., *Bacillus* spp. (*B. subtilis, B. amyloliquefaciens, B. pumillus, B. cereus, B. licheniformis*); *Psueudozyma* spp.; *Pichia* spp.; *Wickerhamomyces* spp.; *Candida* spp. (*C. albicans, C. rugosa, C. tropicalis, C. lipolytica, C. torulopsis*); *Rhodococcus* spp.; *Arthrobacter* spp.; *Campylobacter* spp.; *Corynbacterium* spp. and so on. The biosurfactants may be obtained by fermentation processes known in the art. Preferably, the biosurfactants are isolated from the microorganisms and the products of fermentation.

In some embodiments, the biosurfactants of the antimicrobial biosurfactant component include one or more glycolipids, such as sophorolipids (SLP), rhamnolipids (RLP), trehalose lipids or mannosylerythritol lipids (MEL). In certain preferred embodiments, the one or more glycolipids are sophorolipids, rhamnolipids, or a combination thereof.

In some embodiments, the antimicrobial biosurfactant blend further comprises one or more lipopeptide biosurfactants, for example, surfactin and/or lichenysin. The use of surfactin broadens the spectrum of antimicrobial activity to include Gram-negative bacteria and archaea.

Surfactin is one of a series of lipopeptide biosurfactants referred to as porens. It is known for its antimicrobial, antiviral, antifungal properties, and in particular its antimicrobial effects on both Gram-positive and Gram-negative bacteria. Thus, the use of surfactin broadens the spectrum of antimicrobial activity to include Gram-negative bacteria. Surfactin can be obtained from known fermentation processes in the art. For example, the bacteria *Bacillus subtilis* is known to produce surfactin.

In some embodiments, the biosurfactants of the subject composition are in a purified form. In some embodiments, the biosurfactants are not purified when they are isolated from the microbial culture in which they are produced.

The biosurfactants can be used to inhibit the growth of bacteria at relatively low concentrations. In preferred embodiments, the total biosurfactant concentration used in the subject composition is less than 5,000; 4,000; or 3,000 ppm. In certain embodiments, the concentration is from 1,000 ppm to 3,000 ppm or more. In a specific embodiment, the total biosurfactant concentration is about 2,500 ppm.

The biosurfactants used in the subject invention can be formulated using any number of combinations and proportions. In certain embodiments, the composition comprises SLP, RLP and/or surfactin. In one embodiment, the proportion of SLP in the biosurfactant component is 30% to 100%, preferably 50% to 100%. In one embodiment, the proportion of RLP in the biosurfactant component in a proportion of about 10% to 60%. In one embodiment, the proportion of surfactin in the biosurfactant component is 2% to 50%.

In certain embodiments, the biosurfactant component comprises an SLP solution comprising 400-500 g/L of SLP mixed with water, in an amount of about 2 ml/L of the total composition volume.

In some embodiments, the composition comprises a solvent. The solvent can be an alcohol, for example, methanol, ethanol or isopropyl alcohol. In specific embodiments, the solvent is isopropyl alcohol at a concentration of 1 ml/L to 5 ml/L, preferably a concentration of about 3 ml/L. In certain embodiments, the solvent is added in a concentration of 25 to 100 g/L, preferably 30 to 35 g/L.

In some embodiments, the first ammonium salt can be ammonium chloride, ammonium phosphate, or diammonium phosphate. The second ammonium salt that may be present in the antifreeze mixture can be the same or different from the first ammonium salt. In specific embodiments, the first ammonium salt is ammonium phosphate or diammonium phosphate at a concentration of 1 to 5 ml/L, preferably about 2 ml/L. In certain embodiments, the first ammonium salt is added in a concentration of 1 to 10 g/L, preferably 2 g/L.

In some embodiments, the composition comprises ammonium hydroxide. In specific embodiments, the concentration of ammonium hydroxide is from 1 ml/L to 10 ml/L, preferably about 3 ml/L. In some embodiments, the ammonium hydroxide is a 70% solution.

In some embodiments, the composition further comprises a chelator or chelating agent. As used herein, "chelator" or "chelating agent" means an active agent capable of removing a metal ion from a system by forming a complex so that, for example, the metal ion cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium citrate, and citric acid.

Advantageously, the chelating agent assists in enhancing oil recovery by dissolving scale buildup in the formation and/or in or on equipment used in oil and gas production. Scale can significantly decrease oil recovery because of its ability to clog formation pores, tubing, piping, and other conduits for oil and gas.

In some embodiments, the chelating agent may also enhance the antimicrobial properties of the composition by modifying the cell walls of, for example, Gram-negative bacteria, to be more susceptible to biosurfactant treatment. Consequently, the ability to permeate Gram-negative bacteria broadens the spectrum of antimicrobial capabilities for the subject invention.

The chelating agent can be added to the composition in amounts up to about 5 g/L or more. In specific embodiments, the chelating agent is sodium citrate or EDTA at a concentration of about 0.5 to 3 g/L.

In some embodiments, the composition further comprises phenol, or carbolic acid, which is effective for controlling microbial growth, as well as enhancing oil recovery. In specific embodiments, phenol is at a concentration of 5 to 10 mL/L.

In some embodiments, the composition further comprises one or more $H_2S$ scavengers capable of converting $H_2S$ into more inert forms. As used herein, "hydrogen sulfide scavenger" refers to any chemical that can react with one or more sulfur-containing species, including mercaptans, and can convert it to a more inert form. Effective scavenging is, preferably, the attaining of an irreversible and complete chemical reaction between the scavenger and one or more sulfur-containing species.

The one or more $H_2S$ scavengers can be, for example, nitrate or nitrite solutions. In specific embodiments, the $H_2S$ scavengers are selected from nitrate or nitrite salts, including but not limited to, sodium nitrate, sodium nitrite, ammonium nitrate, ammonium nitrite, potassium nitrate, and potassium nitrite. In preferred embodiments, the nitrate or nitrite salts are ammonium nitrate or ammonium nitrate. In another embodiment, the $H_2S$ scavenger can be glyoxal and/or the hydroxyl radical.

In some embodiments, the composition can comprise additional components, including, for example, sodium carbonate, a hypochlorite salt (e.g., sodium hypochlorite), additional biocides, solvents, emulsifiers, lubricants, buffering agents, pH adjusting agents, solubility controlling agents, carriers, preservatives, stabilizers and ultra-violet light resistant agents or other additives as are deemed necessary.

In some embodiments, the composition is further enhanced for use in cold climates by the addition of an antifreeze mixture comprising one or more of a second ammonium salt, sodium chloride and glycerol. In some embodiments, the antifreeze mixture can further comprise brine fluids.

In some embodiments, the second ammonium salt is diammonium phosphate in a concentration of 1 to 25 g/L, preferably about 10-15 g/L.

In some embodiments, the sodium chloride is present in a concentration of 1 to 25 g/L, preferably about 10-15 g/L.

In some embodiments, the glycerol is present in a concentration of 1 to 20 ml/L, preferably about 5-10 ml/L.

In one embodiment, the subject composition can comprise any number of the above described components, in any combination such that oil recovery is increased, the broadest possible spectrum of biocorrosive bacteria can be controlled, and the greatest amount of hydrogen sulfide is reduced.

Advantageously, in one embodiment, the subject compositions and methods can be used to prevent antibacterial-resistance in SRB species present in oil and gas production environments and oil and gas containing formations.

Advantageously, the present invention can be used without releasing large quantities of inorganic compounds into the environment. Additionally, the compositions and methods utilize components that are biodegradable and toxicologically safe. Furthermore, the present composition can function as its own antifreeze, meaning it can prevent itself from freezing or forming ice crystals when used in cold climates.

Sulfur Reducing Bacteria and MIC

In one embodiment, the composition can be used to control SRB and other biocorrosive bacteria. In one embodiment, the biocorrosive bacteria are in the form of a biofilm.

Many SRB belong to the phylum Proteobacteria. Of those, one group of obligate anaerobes fall within the class Deltaproteobacteria. This group includes *Desulfuromonas, Desulfurella, Geobacter,* and *Pelobacter*. Other Proteobacteria classes comprise microaerophiles, which include *Wolinella, Campylobacter, Shewanella, Sulfurospirillum,* and *Geospirillum bamesi*.

Many other SRB belong to archaea from a phylogenetically diverse class and belong (but are not limited) to the following orders: Thermococcales, Thermoproteales, Pyrodictales, and Sulfolobales. Moreover, SRB are found in several other phylogenetic lines. Currently, 60 genera containing more than 220 species of SRB are known.

In certain embodiments, the compositions of the subject invention can have broad-spectrum antimicrobial properties, meaning they can be used to control both Gram-positive and Gram-negative bacteria, as well as other biocorrosive microorganisms. Further examples of microorganisms that can be controlled by the present composition, which are responsible for deterioration processes in natural gas and oil and which have been isolated from oil, brine water, petroleum and gas equipment include, but are not limited to, the following: *Methanobacterium curvum, Methanocalculus halotolerans, Methanoculleus* spp., *Methanofollis* spp. (e.g., *M. liminatans*), *Methanosarcina* spp. (e.g., *M. barkeri, M. siciliae*), *Methanospirillum hungatei, Anaerobaculum mobile, Thermodesulfovibrio yellowstonii, Desulfovibrio* spp. (e.g., *D. vulgaris*), *Thermotoga* spp. (e.g., *T. hypogea, T. neapaitan*), *Clostridium* spp. (e.g., *C. sporogenes, C. bifermentas, C. celerecrescens*), *Desulfotomaculum* spp. (e.g., *D. kuznetsorii*), *Desulfovibrio desulfuricans, Citrobacter freundii, Cetobacterium somerae, Klebsiella pneumonia, Acinetobacter* spp. (e.g., *A. junii*), *E. coli, Pseudomonas aeruginosa,* and *Staphylococcus auriculari*.

In one embodiment, the composition can inhibit $H_2S$ production by SRB and other biocorrosive bacteria by controlling the biocorrosive bacteria. In another embodiment, the composition can reduce the concentration of hydrogen sulfide present in an oil containing formation or in oil production equipment. Even further, the composition can reduce and/or prevent corrosion of oil and gas production equipment due to the presence of microorganisms, their biofilms, and/or their corrosive metabolites (e.g., hydrogen sulfide, acids).

Cultivation of Microorganisms and Production of Microbial Growth By-Products

In some embodiments, methods are provided for cultivating microorganisms and/or producing their growth by-products, for example, biosurfactants, for use in the subject compositions and methods. The microorganisms grown according to the systems and methods of the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In one embodiment, the microorganism is a yeast or fungus. Yeast and fungus species suitable for use according to the current invention, include *Acaulospora, Aspergillus, Aureobasidium* (e.g., *A. pullulans*), *Blakeslea, Candida* (e.g., *C. albicans, C. apicola, C. batistae, C. bombicola, C. floricola, C. kuoi, C. riodocensis, C. stellate*), *Debaryomyces* (e.g., *D. hansenii*), *Entomophthora, Glomus* (e.g., *G. mosseae*), *Hanseniaspora* (e.g., *H. uvarum*), *Hansenula, Issatchenkia, Kluyveromyces, Lentinula edodes, Mortierella, Mucor* (e.g., *M. piriformis*), *Penicillium, Phythium, Phycomyces, Pichia* (e.g., *P. anomala, P. guielliermondii, P. occidentalis, P. kudriavzevii*), *Pseudozyma* (e.g., *P. aphidis*), *Rhizopus, Rhodotorula* (e.g., *R. bogoriensis*); *Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamiella* (e.g., *W. domericqiae*), *Wickerhamomyces* (e.g., *W. anomalus*), *Williopsis, Zygosaccharomyces*.

In one embodiment, the microorganism is a yeast known as a "killer yeast." As used herein, "killer yeast" means a strain of yeast characterized by its secretion of toxic proteins or glycoproteins, to which the strain itself is immune. Killer yeasts can include, but are not limited to species of, for example, *Candida* (e.g., *C. nodaensis*), *Cryptococcus, Debaryomyces* (e.g., *D. hansenii*), *Hanseniaspora*, (e.g., *H. uvarum*), *Hansenula, Kluyveromyces* (e.g., *K. phaffii*), *Pichia* (e.g., *P. anomala, P. guielliermondii, P. occidentalis, P. kudriavzevii*), *Saccharomyces* (e.g., *S. cerevisiae*), *Torulopsis, Ustilago* (e.g., *U. maydis*), *Wickerhamomyces* (e.g.,

*W. anomalus*), *Williopsis* (e.g., *W. mrakii*), *Zygosaccharomyces* (e.g., *Z. bailii*), and others.

In one embodiment, the microorganisms are bacteria, including Gram-positive and Gram-negative bacteria, as well as some archaea. The bacteria may be, spore-forming, or not. The bacteria may be motile or sessile. The bacteria may be anaerobic, aerobic, microaerophilic, facultative anaerobes and/or obligate aerobes. Bacteria species suitable for use according to the present invention include, for example, *Acinetobacter* (e.g., *A. calcoaceticus, A. venetianus*); *Agrobacterium* (e.g., *A. radiobacter*), *Azotobacter* (*A. vinelandii, A. chroococcum*), *Azospirillum* (e.g., *A. brasiliensis*), *Bacillus* (e.g., *B. amyloliquefaciens, B. firmus, B. laterosporus, B. licheniformis, B. megaterium, B. mucilaginosus, B. subtilis, B. coagulans* GBI-30 (BC30)), *Chlorobiaceae* spp., *Dyadobacter fermenters*, *Frankia* spp., *Frateuria* (e.g., *F. aurantia*), *Klebsiella* spp., *Microbacterium* (e.g., *M. laevaniformans*), *Pantoea* (e.g., *P. agglomerans*), *Pseudomonas* (e.g., *P. aeruginosa, P. chlororaphis, P. chlororaphis* subsp. *aureofaciens* (*Kluyver*), *P. putida*), *Rhizobium* spp., *Rhodospirillum* (e.g., *R. rubrum*), *Sphingomonas* (e.g., *S. paucimobilis*), and/or *Xanthomonas* spp.

In one embodiment, the microorganism is a biosurfactant-producing bacterium, yeast or fungus. In one embodiment, the microorganism is a glycolipid-producing yeast, such as, e.g., *Starmerella bombicola* or *Wickerhamomyces anomalus*. In one embodiment, the microorganism is a lipopeptide-producing bacterium, such as a *Bacillus* spp. bacterium (e.g., *B. subtilis, B. amyloliquefaciens, B. licheniformis*). In one embodiment, the microorganism is a biosurfactant-producing *Trichoderma* spp. fungus.

Other microbial strains including, for example, other strains capable of accumulating significant amounts of, for example, biosurfactants can be used in accordance with the subject invention. Other metabolites useful according to the present invention include mannoprotein, beta-glucan and other metabolites that have bio-emulsifying and surface/interfacial tension-reducing properties.

The subject invention utilizes methods for cultivation of microorganisms and production of microbial metabolites and/or other by-products of microbial growth. The subject invention further utilizes cultivation processes that are suitable for cultivation of microorganisms and production of microbial metabolites on a desired scale. The microbial cultivation systems would typically use submerged culture fermentation; however, surface culture and hybrid systems can also be used. As used herein "fermentation" refers to growth of cells under controlled conditions. The growth could be aerobic or anaerobic.

In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

In one embodiment, the subject invention provides materials and methods of producing a biosurfactant by cultivating a microbe strain of the subject invention under conditions appropriate for growth and biosurfactant production; and isolating the biosurfactant from the products of cultivation. Optionally, the biosurfactant can be purified.

In one embodiment, the subject invention further provides a method for producing microbial metabolites such as, e.g., ethanol, ethanol, lactic acid, beta-glucan, proteins, peptides, metabolic intermediates, polyunsaturated fatty acid, and lipids. The metabolite content produced by the method can be, for example, at least 20%, 30%, 40%, 50%, 60%, 70%, 80%, or 90%.

The microbial growth by-product produced by microorganisms of interest may be retained in the microorganisms or secreted into the liquid medium. In another embodiment, the method for producing microbial growth by-product, such as biosurfactants, may further comprise steps of isolating, and optionally, concentrating and purifying the microbial growth by-product of interest. In a further embodiment, the liquid medium may contain compounds that stabilize the activity of microbial growth by-product.

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g. measurement of cell number and growth phases). Alternatively, a daily sample may be taken from the vessel and subjected to enumeration by techniques known in the art, such as dilution plating technique. Dilution plating is a simple technique used to estimate the number of bacteria in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method of cultivation can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, rice bran oil, olive oil, corn oil, sesame oil, and/or linseed oil. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, and/or sodium carbonate. These inorganic salts may be used independently or in a combination of two or more.

In some embodiments, the method for cultivation may further comprise adding additional acids and/or antimicrobials in the liquid medium before, and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

The biomass content of the fermentation medium may be, for example from 5 g/l to 180 g/l or more. In one embodiment, the solids content of the medium is from 10 g/l to 150 g/l.

In one embodiment, all of the microbial cultivation composition is removed upon the completion of the cultivation (e.g., upon, for example, achieving a desired cell density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a cell-free broth or contain cells. In this manner, a quasi-continuous system is created.

Advantageously, the method does not require complicated equipment or high energy consumption. The microorganisms of interest can be cultivated at small or large scale on site. Similarly, the microbial metabolites or other by-products can also be produced at large quantities at the site of need.

Advantageously, the microbe-based products can be produced in remote locations. The microbe growth facilities may operate off the grid by utilizing, for example, solar, wind and/or hydroelectric power.

Preparation of Microbe-Based Products

One microbe-based product of the subject invention is simply the fermentation broth containing the microorganism and/or the microbial metabolites produced by the microorganism and/or any residual nutrients. The product of fermentation may be used directly without extraction or purification. If desired, extraction or isolation and, optionally, purification can be easily achieved using standard methods or techniques described in the literature.

The microbe-based products may be used without further stabilization, preservation, and storage. Advantageously, direct usage of these microbe-based products reduces the possibility of contamination from foreign agents and undesirable microorganisms, and maintains the activity of the by-products of microbial growth.

The biochemicals produced as a result of microbial growth can be removed from the growth vessel and transferred via, for example, piping for immediate use.

In other embodiments, the composition (microbes, broth, metabolites, or a combination thereof) can be placed in containers of appropriate size, taking into consideration, for example, the intended use, the contemplated method of application, the size of the fermentation tank, and any mode of transportation from microbe growth facility to the location of use. Thus, the containers into which the microbe-based composition is placed may be, for example, from 1 gallon to 1,000 gallons or more. In other embodiments the containers are 2 gallons, 5 gallons, 25 gallons, or larger.

Upon harvesting the microbe-based composition from the growth vessels, further components can be added as the harvested product is placed into containers and/or piped (or otherwise transported for use). The additives can be, for example, buffers, carriers, other microbe-based compositions produced at the same or different facility, additional biosurfactants or chemical surfactants, solvents, salts, chelating agents, acids, viscosity modifiers, preservatives, nutrients for microbe growth, tracking agents, biocides, and other microbes and other ingredients specific for an intended use.

In specific embodiments, the microbe-based product comprises the composition for biochemically enhanced oil recovery comprising an antimicrobial biosurfactant component, a solvent, an ammonium salt, and ammonium hydroxide.

In some embodiments, the microbe-based product comprises the composition for biochemically enhanced oil recovery, enhanced by the addition of one or more of a chelating agent, a phenol (e.g., carbolic acid or phenolic acid), and/or one or more $H_2S$ scavengers.

The composition can further be enhanced for use in cold climates, for example, with one or more of diammonium phosphate, sodium chloride, glycerol and/or brine fluids.

Other suitable additives, which may be contained in the formulations according to the invention, include substances that are customarily used for such preparations. Example of such additives include emulsifying agents, lubricants, buffering agents, solubility controlling agents, pH adjusting agents, preservatives, stabilizers and ultra-violet light resistant agents.

In one embodiment, the composition may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid and mixtures thereof.

The pH of the microbe-based composition should be suitable for the microorganism of interest. In a preferred embodiment, the pH of the microbe-based composition ranges from 5.5 to 7.5.

In one embodiment, additional components such as an aqueous preparation of a salt, such as sodium bicarbonate or carbonate, sodium sulfate, sodium phosphate, or sodium biphosphate, can be included in the formulation.

Advantageously, in accordance with the subject invention, the microbe-based composition may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Methods for Biochemically Enhanced Oil Recovery, SRB Control and Hydrogen Sulfide Reduction In one embodiment, a method is provided for simultaneously enhancing oil recovery, improving the quality of oil and gas, and preventing and/or reducing corrosion of oil and gas production equipment.

The subject methods can be used to directly reduce $H_2S$ and/or mercaptan content in wells and crude oil and gas and the environments in which oil and gas are produced. These methods can also indirectly reduce $H_2S$ and/or mercaptan content by inhibiting $H_2S$ and/or mercaptan production by SRB and other biocorrosive bacteria. The methods can further be used to reduce the "sourness" of crude oil and gas, reduce the conversion of sweet oil and gas to sour oil and gas, increase the conversion of sour oil and gas to sweeter oil and gas, and/or preserve the sweetness of oil and gas.

In one embodiment, the method can be used to reduce the acidity of oil. For example, the application of certain ammonium compounds can increase the pH of oil, thus increasing its economic value and reducing the amount of processing required prior to refining the oil.

In certain embodiments, the methods can also be used for reducing and/or eliminating microbial induced corrosion ("MIC") of equipment and structures used for crude oil and natural gas production through the reduction in microbial biofilms, acids, and hydrogen sulfide concentration.

In specific embodiments, the method comprises applying a multi-functional composition of the subject invention to an oil and/or gas-containing formation by, for example, injecting the composition into a wellbore, and allowing the composition to enhance oil and/or gas recovery, reduce $H_2S$ concentration in the formation, and control SRB.

In one embodiment, the method comprises applying a composition comprising an antimicrobial biosurfactant component, a solvent, an ammonium salt and ammonium hydroxide to the oil and gas-containing formation. In some embodiments, the method is applied to a stripper well.

Furthermore, the method can comprise adding one or more of a chelating agent, a phenol, and/or one or more $H_2S$ scavengers to the formation.

Even further, the method can comprise adding an antifreeze mixture comprising one or more of diammonium phosphate, sodium chloride and glycerol with the multifunctional composition. Thus, in certain embodiments, the methods can be utilized in areas of the world where temperatures at the earth's surface are near, at, or below freezing. For example, the addition of the antifreeze mixture can be useful during transport of the composition or when it is being pumped in and/or out of an oil and/or gas-bearing formation.

Advantageously, in preferred embodiments, the subject methods utilize isolated microbial growth by-products without the addition of the microbes that produce them. Compared to MEOR methods, this allows the methods to be particularly useful in formations having low permeability and/or low porosity, as well as formations with temperatures higher than those that can be tolerated by the microbes.

The composition can be applied in an amount of at least 1,000 barrels, preferably in amounts of at least 500 barrels, even more preferably in the amount of 80 barrels total. In some embodiments, the composition is applied in a range between 80 and 1,000 BBLS, depending on the amount of hydrogen sulfide present. Thus, in one embodiment of the subject methods, the step of determining the concentration of hydrogen sulfide present (e.g., in ppm), is performed prior to determining treatment volume and application of the treatment. $H_2S$ concentration can also be monitored during and/or after treatment.

The application of the compositions and products of the present invention can be performed during drilling operations (e.g., while drilling, while tripping-in or tripping-out of the hole, while circulating mud, while casing, while placing a production liner, and/or while cementing, etc.), and as a production treatment. Application can comprise pumping for as long as 5 hours or more, depending upon the amount of composition being applied.

In an exemplary embodiment, the composition is pumped into the annulus of a well between the casing and tubing and displaced into the formation. After the composition has been applied to the well, the method further comprises the step of shutting the well for about 3 to about 7 days, preferably about 6 days, or from about 1 week to about 3 weeks, or until as long as necessary to allow the composition to control biocorrosive bacteria and reduce hydrogen sulfide concentration in the formation.

In one embodiment, the subject invention can be utilized in non-well settings to control $H_2S$ and/or mercaptans present in oil and/or gas, wherein the subject composition is applied to oil and/or gas that has been recovered from a well and is being held, for example, in a storage tank.

In one embodiment, the subject compositions and methods can be used to prevent or inhibit SRB species in oil and gas production environments and oil and gas containing formations from developing resistance to antibacterial treatments.

In one embodiment the hydrogen sulfide content of natural gas in particular is reduced using a biological scrubber and the antimicrobial and microbe-based compositions of the present invention. Biological scrubbers utilize microbial fixation to desulfurize natural gas. In certain scrubbers, the gas is streamed through a vessel containing media, such as a screen or a liquid matrix, on or in which microorganisms are encouraged to grow. Air is then injected into the vessel and hydrogen sulfide in the gas is oxidized by chemical and biological reactions.

Local Production of Microbe-Based Products

In certain embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The microbe growth facilities of the subject invention can be located at the location where the microbe-based product will be used (e.g., an oil well). For example, the microbe growth facility may be less than 300, 250, 200, 150, 100, 75, 50, 25, 15, 10, 5, 3, or 1 mile from the location of use.

Because the microbe-based product can be generated locally, without resort to the microorganism stabilization, preservation, storage and transportation processes of conventional microbial production, a much higher density of microorganisms can be generated, thereby requiring a smaller volume of the microbe-based product for use in the on-site application or which allows much higher density microbial applications where necessary to achieve the desired efficacy. This makes the system efficient and can eliminate the need to stabilize cells or separate them from their culture medium. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have remained in the supply chain for some time. The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

The microbe growth facilities of the subject invention produce fresh, microbe-based compositions, comprising the microbes themselves, microbial metabolites, and/or other components of the medium in which the microbes are grown. If desired, the compositions can have a high density of vegetative cells or propagules, or a mixture of vegetative cells and propagules.

In one embodiment, the microbe growth facility is located on, or near, a site where the microbe-based products will be used, for example, within 300 miles, 200 miles, or even within 100 miles. Advantageously, this allows for the compositions to be tailored for use at a specified location. The formula and potency of microbe-based compositions can be customized for a specific application and in accordance with the local conditions at the time of application.

Advantageously, distributed microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, microbial metabolites.

Furthermore, by producing a composition locally, the formulation and potency can be adjusted in real time to a specific location and the conditions present at the time of application. This provides advantages over compositions that are pre-made in a central location and have, for example, set ratios and formulations that may not be optimal for a given location.

The microbe growth facilities provide manufacturing versatility by their ability to tailor the microbe-based products to improve synergies with destination geographies. Advantageously, in preferred embodiments, the systems of the subject invention harness the power of naturally-occurring local microorganisms and their metabolic by-products.

Local production and delivery within, for example, 24 hours of fermentation results and substantially lower shipping costs. Consumers will benefit greatly from this ability to rapidly deliver microbe-based products.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Production of Lipopeptides by *Bacillus* SPP

Fermentation of *Bacillus* bacteria can be performed in a nutrient medium containing (g/L), for example:

| | |
|---|---|
| Glucose | 18 |
| Powder molasses | 2 |
| Sucrose | 1 |
| $KH_2PO_4$ | 0.5 |
| $Na_2HPO_4 \cdot 7H_2O$ | 2.1 |
| KCl | 0.1 |
| $MgSO_4$ | 0.5 |
| $CaCl_2$ | 0.05 |
| Urea | 2.5 |
| $NH_4Cl$ | 1.24 |
| Yeast extract | 2 |
| Corn peptone | 0.5 |
| TekNova trace element (mL) | 1 |
| pH 6.8 | |

Temperature of cultivation is about 40° C., pH stabilization is from 6.8-7.0, and DO stabilization is at 30% (concentration of oxygen in the air is taken as 100%). Duration of cultivation is 24-32 hours. The final concentration of bacterial culture is no less than $1 \times 10^9$ CFU/ml. The concentration of lipopeptides is 5-10 g/L.

Example 2—Fermentation of *Starmerella bombicola* for Biosurfactant Production in a 2000 L Gallon Reactor A large-scale, fully enclosed reactor with PLC-operated temperature, pH and DO controls, is used. The reactor has a working volume of 1500 L when growing *S. bombicola* for SLP production.

In some embodiments, the nutrients for SLP production are glucose, urea, yeast extract, canola oil, magnesium sulfate, and potassium phosphate.

The reactor is inoculated with 10 liters of liquid culture grown in inoculum reactors. The duration of the cultivation cycle for SLP production is up to 120 hours, at 25° C. and pH 3.5, with sampling performed once a day.

The final concentration of SLP is 70 gallons, with SLP concentration of 300-400 g/L.

Example 3—Suppression of Bacterial Growth

The efficiency of the subject composition for bacterial growth suppression was tested in petri dishes for both Gram-positive and Gram-negative bacteria. A lawn of Gram-positive *Bacillus subtilis* B1 was plated on half of the treatment plates, and a lawn of Gram-negative *Pseudomonas stutzeri* was plated on the other half of treatment plates.

Three drops of approximately 2 mL of each composition were dropped into separate thirds of the plate and incubated over the course of 2 or 4 days (depending on treatment set) at 37-40° C.

Figure 1B:
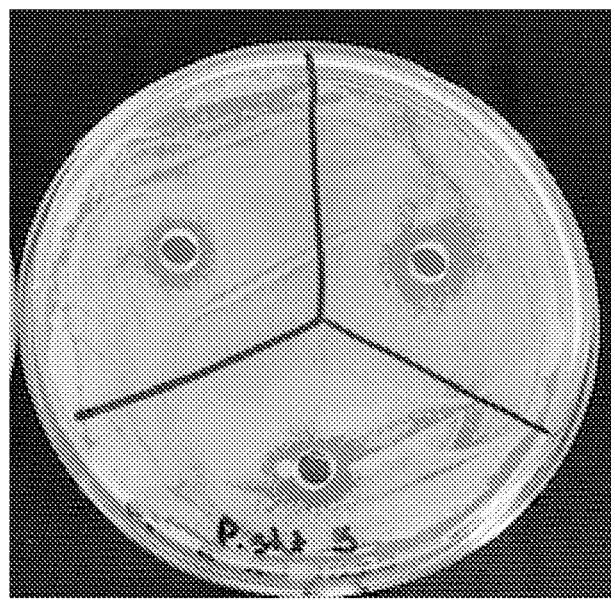

As shown in FIGS. 1A-1B, a composition, comprising sophorolipid, ammonium hydroxide, isopropyl alcohol, ammonium phosphate, phenol and glyoxal, suppressed growth of *B. subtilis* (1A) and *P. stutzeri* (1B) over a four day period.

Example 4—Oil Extraction Capacity

Oil extraction capability was tested using 40-100 mesh pure sands (ACROS Organics™ Thermo-Fisher Scientific). Sands were first mixed with crude oil with a sand to oil ratio of 14:1. The oil sand mixture was then aged inside an oven at 50° C. for at least 4 days. Sand columns were built by tightly packing 30 g of aged sands into clear glass vials.

Different composition formulations were tested for crude oil extraction from the aged sand columns at a temperature from 30 to 70° C. Each sand column contained approximately 20 mL of the treatment product. The extracted crude oil flowed to the top layer of liquid phase. Volume of crude oil was quantified by measuring the depth of the extracted oil layer and converting the depth into volume. Volume of water was used to calculate the ratio of depth to volume conversion. The concave meniscus of the oil layer surface is around 0.5 mm.

A composition comprising: 2 ml/L Locus SLP (solution of 400-500 g/L of pure SLP mixed with water), 3 ml/L ammonium hydroxide, 3 ml/L isopropyl alcohol, 2 g/L ammonium phosphate, 10 ml/L phenol, 10 ml/L glyoxal, and 10 g/L sodium carbonate, produced a 70% recovery of oil from the oil sands after 7 days.

Figure 2:
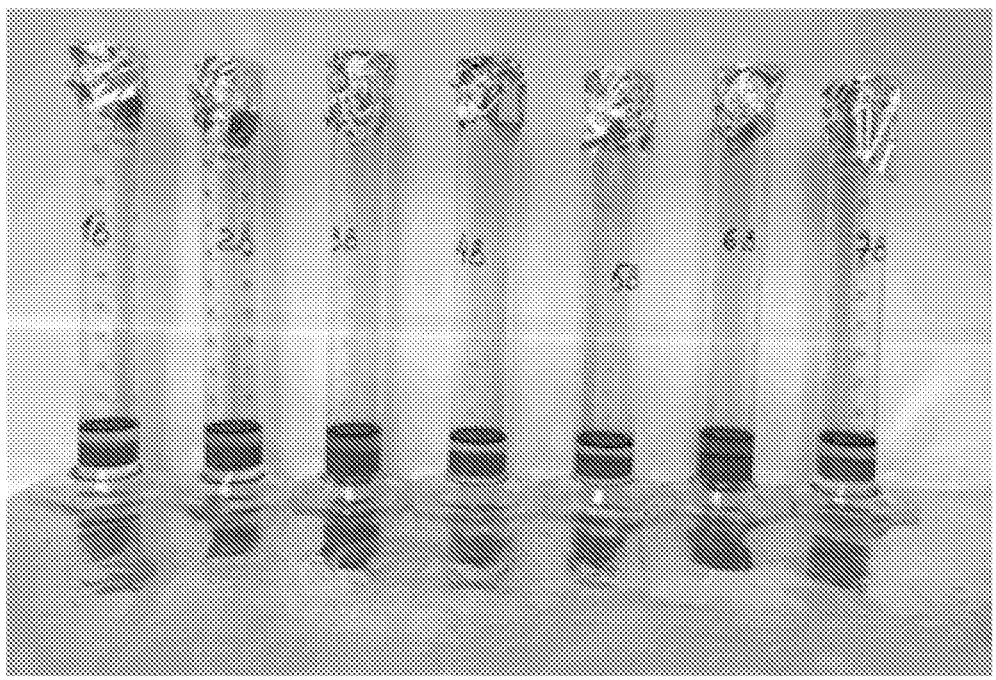
FIG. 2 shows oil recovery from aged sand samples treated with various compositions, over a four day period. The tube marked "5" was treated with the same composition used in FIGS. 1A-1B.

A composition comprising: 2 ml/L Locus SLP, 3 ml/L ammonium hydroxide, 3 ml/L isopropyl alcohol, 2 g/L ammonium phosphate, 6 ml/L phenol, and 10 ml/L glyoxal, produced a 60% recovery of oil from the oil sands after 4 days. (Shown in FIG. 2, the tube marked "5B" was treated with this formulation.)

Figure 3:
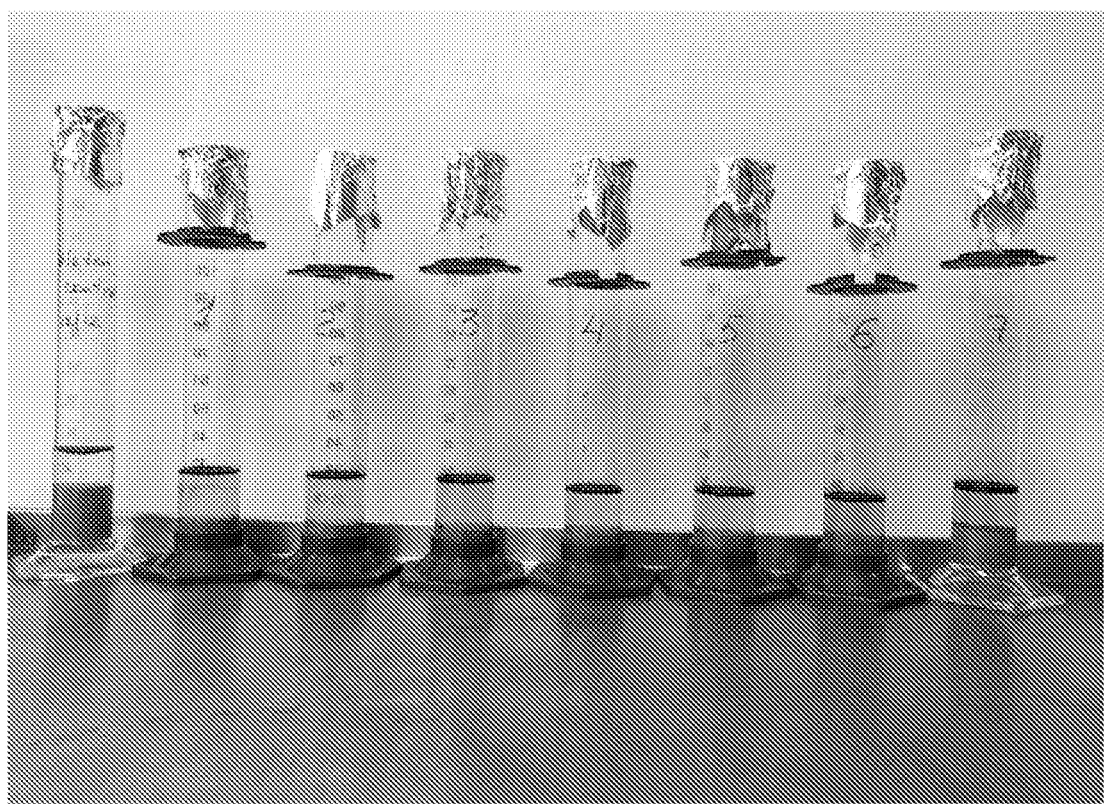
FIG. 3 shows oil recovery from aged sand samples treated with various compositions, over a two day period. The tube marked "4" was a composition according to the subject invention, comprising sophorolipid, ammonium hydroxide, isopropyl alcohol, ammonium phosphate, phenol, and glyoxal.

A composition comprising: 2 ml/L Locus SLP, 3 ml/L ammonium hydroxide, 3 ml/L isopropyl alcohol, 2 g/L ammonium phosphate, 5 ml/L phenol, and 5 ml/L glyoxal, produced a 60% recovery of oil from the oil sands after 2 days. (Shown in FIG. 3, the tube marked "4" was treated with this formulation.)

We claim:

1. A multi-functional composition for biochemically enhanced oil recovery comprising:
    an antimicrobial biosurfactant component comprising a glycolipid, a lipopeptide, or a combination thereof, wherein the glycolipid is selected from the group consisting of sophorolipids and rhamnolipids,
    a solvent,
    a first ammonium salt,
    ammonium hydroxide, and
    glyoxal,
    wherein the composition does not comprise live microorganisms.

2. The composition of claim 1, wherein the solvent is isopropyl alcohol.

3. The composition of claim 1, wherein the first ammonium salt is selected from the group consisting of ammonium chloride, ammonium phosphate and diammonium phosphate.

4. The composition of claim 1, further comprising one or more of: ethylenediaminetetraacetic acid (EDTA), carbolic acid and phenolic acid.

5. A method for simultaneously enhancing oil recovery from a formation, improving the quality of oil and gas recovered from the formation, and preventing and/or reducing corrosion of oil and gas production equipment, wherein the method comprises determining the amount of hydrogen sulfide in an oil and/or gas-containing formation, and applying a multi-functional composition to the formation, said composition comprising:
    an antimicrobial biosurfactant component comprising a glycolipid, a lipopeptide, or a combination thereof, wherein the glycolipid is selected from the group consisting of sophorolipids and rhamnolipids,
    a solvent,
    a first ammonium salt, ammonium hydroxide, and
    glyoxal,
    and further wherein no live microorganisms are applied to the oil and/or gas-containing formation.

6. The method of claim 5, wherein the solvent is isopropyl alcohol.

7. The method of claim 5, wherein the first ammonium salt is selected from the group consisting of ammonium chloride, ammonium phosphate and diammonium phosphate.

8. The method of claim 5, further comprising applying one or more of: ethylenediaminetetraacetic acid (EDTA), carbolic acid and phenolic acid to the formation.

9. The method of claim 5, wherein the method dissolves scale in the formation and in oil and gas production equipment.

10. The method of claim 5, wherein the method improves oil and/or gas quality by reducing the hydrogen sulfide and/or mercaptan concentration of the oil and/or gas.

11. The method of claim 5, wherein the method reduces microbial induced corrosion (MIC).

12. The method of claim 5, wherein the method controls sulfate-reducing bacteria (SRB).

* * * * *